No. 643,051. Patented Feb. 6, 1900.
W. H. GRIFFITH.
CHAIN LINK.
(Application filed June 12, 1899.)
(No Model.)
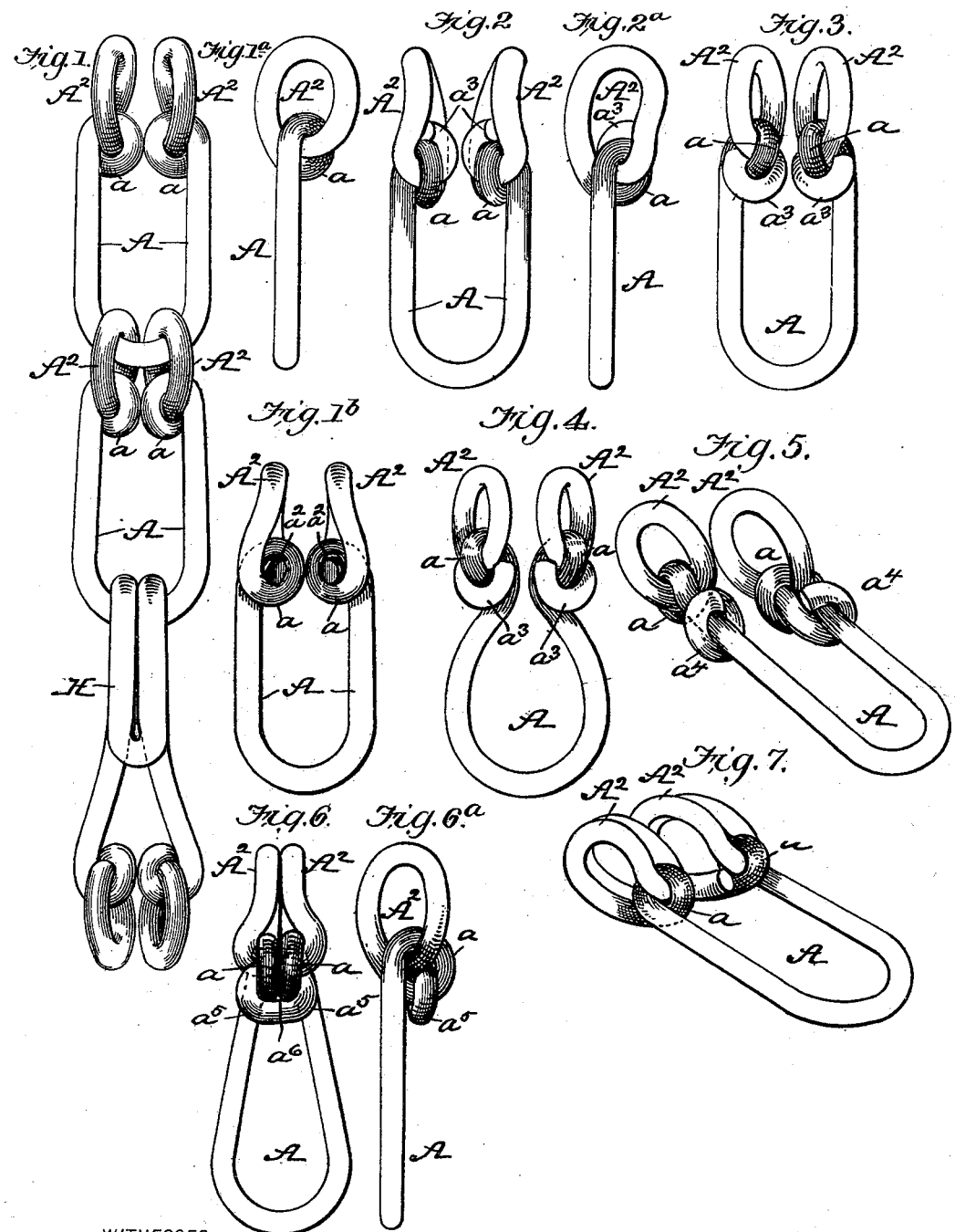
WITNESSES
INVENTOR
William H. Griffith.
BY
ATTORNEYS.

UNITED STATES PATENT OFFICE.

WILLIAM H. GRIFFITH, OF BALTIMORE, MARYLAND.

CHAIN-LINK.

SPECIFICATION forming part of Letters Patent No. 643,051, dated February 6, 1900.

Application filed June 12, 1899. Serial No. 720,277. (No model.)

*To all whom it may concern:*

Be it known that I, WILLIAM H. GRIFFITH, of Baltimore city, in the State of Maryland, have invented a new and useful Improvement in Chain-Links, of which the following is a specification.

My invention relates to links of that kind which are made from wire, rods, or flexible sections of metal or other suitable material bent into shape.

It relates to that particular form of link in which there is a loop (in the middle of the section of wire) forming one end of the link, while the other end of the link is formed by two terminal eyes, which are brought to lie side by side to receive through them both the loop of the next adjacent link in forming a chain.

My invention consists, chiefly, in locking the ends of the terminal eyes in convolutions coiled in the shanks and at a point near the terminal eyes and at one end of the open portion of the link.

It also consists in further details, which will be hereinafter more fully described, with reference to the drawings, in which—

Figure 1 is a side view of the simplest form of my invention with two links joined as a chain and with a hook attached and formed in accordance with my invention. Fig. 1$^a$ is a side view of the link shown in Fig. 1, and Fig. 1$^b$ is an opposite face view from that shown in Fig. 1. Figs. 2 and 2$^a$ are respectively a side and an edge view of a modified form of link. Figs. 3 and 4 are side views of other modifications. Fig. 5 is a perspective view of still another modification. Figs. 6 and 6$^a$ are respectively side and edge views of another form of link. Fig. 7 is a perspective view of still another modification of my invention, in which each eye is made double.

In the drawings, Figs. 1, 1$^a$, and 1$^b$, A is the loop portion or body of the link, which is formed from the middle part of a piece of wire or other suitable material. The two shanks of the loop are coiled as they approach the other end of the link into complete convolutions $a\ a$, and then the two ends are bent into terminal eyes A$^2$ A$^2$, which lie side by side and receive through them the loop portion A of the next adjacent link of the chain.

The extreme ends $a^2$ of the wire forming the terminal eyes extend through the closely-fitting convolutions $a\ a$ and are completely inclosed and tightly gripped thereby and constricted therein, so that the greater the tensile strain on the terminal eyes A$^2$, pulling in one direction, and the loop A, pulling in the other direction, the tighter will the coil or convolutions $a$ be drawn around the ends $a^2$ $a^2$ and the more securely the latter will be held.

In modifying my invention, instead of simply projecting the ends $a^2$ through the convolutions $a$, I may extend the ends $a^2$ in hook shape, as at $a^3$ in Figs. 2 and 2$^a$, so as to grasp the near side of the convolution from the terminal eye, or, as in Figs. 3 and 4, I may make the hook $a^3$ to grasp the far side of the convolution from the eye, and the end may be turned outwardly, as in Fig. 3, or inwardly, as in Fig. 4.

As a further modification (see Fig. 5) the ends of the terminal eyes, after passing through the convolutions $a$, may have a hook-shaped wrap $a^4$ turned around the shanks of the loop A outside of the convolution $a$.

In Figs. 6 and 6$^a$ the ends $a^5$ of the terminal eyes are both carried in opposite directions to each other through both the convolutions $a\ a$ and are then bent around on the far side of the convolutions and are made to abut against each other at $a^6$. This serves the additional function of locking together the two terminal eyes A$^2$ A$^2$, so that they cannot separate from each other.

In Fig. 7 the ends of the wire forming the terminal eyes are first carried through the convolutions $a$ and are then bent around to form another terminal eye lying flat against and parallel with the first named, so that the end of the link has the great strength not only of the pinching or constricting convolutions $a\ a$, but also of four thicknesses of wire at the end, which adapts it for use as a plow-clevis and for many other purposes requiring great strength.

In making use of my invention I do not confine myself to its application in chains, but may use it for clevices, for slings, for fire-escape ladders, and for any other uses for which it may be found applicable. Furthermore, I may construct my invention in the form of a hook, as shown in Fig. 1, by simply elongating the loop A and bringing together its two branches and bending them over, as shown at H, and I would have it understood that when I speak of a "link" I mean it to include the hook form as well.

Having thus described my invention, what I claim as new, and desire to secure by Letters Patent, is—

1. A link, or its described equivalent, formed of a section of material bent about the middle and having its two shank portions extended in the same direction and coiled each into a complete convolution, then bent into terminal eyes, and having the ends of the same extended through and tightly gripped by the said convolutions, substantially as and for the purpose described.

2. A link or its described equivalent, formed of a section of material bent in the middle somewhat in the form of the letter U the legs or shank portions being extended and coiled each into a complete convolution then bent into terminal eyes and having the ends of the same extended through and tightly gripped by said convolutions substantially as and for the purpose described.

3. A link, or its described equivalent, formed of a section of wire bent in the middle and having its two shank portions extended and coiled each into a complete convolution, then bent into terminal eyes, and having the ends of the same extended through and tightly gripped by said convolutions, and then bent around in hook shape to embrace also the wire forming the convolutions, substantially as described.

4. A link, or its described equivalent, formed of a section of wire bent about the middle and having its two legs or shank portions extended in the same direction and then twisted into two coils or convolutions, the ends of each coil or convolution being twisted again into loops or terminal eyes, and the extreme ends of each eye or loop being extended through one or both of said coils or convolutions formed by said legs or shanks, so that the greater the tensile strain applied to the link the tighter the ends of the wire are gripped within the folds of said convolutions.

5. A link, or its described equivalent, formed of a section of wire bent in the middle, and having its two shank portions extended and coiled each into a complete convolution, then bent into terminal eyes, and having the ends of the terminal eyes both extended in opposite directions to each other through both the convolutions and turned as described to lock the two convolutions and terminal eyes together substantially as described.

6. A link, or its described equivalent, formed of a section of wire bent in the middle, and having its two shank portions extended and first bent into complete convolutions and then coiled into terminal eyes, each shank having its terminal eye formed with two coils side by side substantially as described.

WILLIAM H. GRIFFITH.

Witnesses:
EDW. W. BYRN,
J. MIDDLETON.